Nov. 16, 1948.    H. CLAYTON-WRIGHT    2,454,036
FLUID SEALS FOR SHAFTS
Filed Jan. 31, 1945
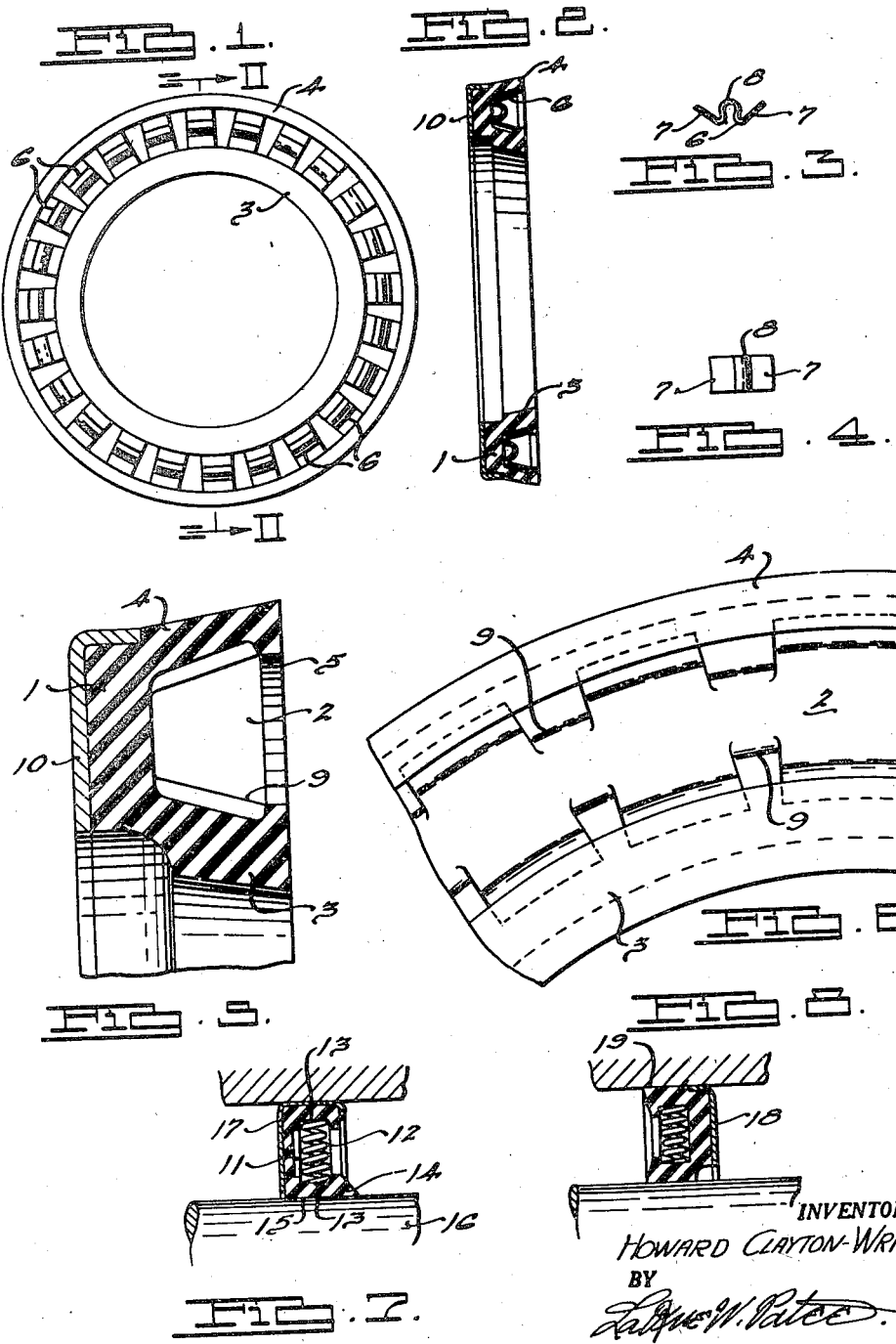
INVENTOR.
HOWARD CLAYTON-WRIGHT
BY
ATTORNEY.

Patented Nov. 16, 1948

2,454,036

UNITED STATES PATENT OFFICE 2,454,036

FLUID SEAL FOR SHAFTS

Howard Clayton-Wright, Stratford - on - Avon, England, assignor to Simpson Catherwood Leonard, Detroit, Mich.

Application January 31, 1945, Serial No. 575,380
In Great Britain May 16, 1944

2 Claims. (Cl. 288—3)

This invention relates to fluid seals for shafts comprising a packing ring which is fixed between the shaft and housing, and is a push fit on one of the parts by means of which it is stationarily held and has a resilient lip for pressing on the other rotating part. The invention has for its object a sealing ring in which the sealing lip is pressed with considerable pressure on the rotating shaft.

According to the present invention, spring pressure is applied at intervals on the sealing lip by spring members. The spring members may be independent springs. The independent springs or spring arms may also be applied to press the sealing ring against the stationary member. The re-action of the spring force on the sealing lip may be counteracted by the re-action of the pressure pressing the sealing ring against the stationary housing.

Referring to the drawings:

Figure 1 is an inner face view of a packing ring constructed according to this invention.

Figure 2 is a section on line II—II of Figure 1.

Figure 3 is an edge view of a spring to be fitted in the packing ring as shown by Figures 1 and 2.

Figure 4 is a face view of the spring as shown by Figure 3.

Figure 5 is an enlarged cross sectional view through the packing ring as shown by Figures 1 and 2 with the springs detached.

Figure 6 is an inside view of a portion of the ring as shown by Figure 5.

Figure 7 is a cross sectional view of a modified form of packing ring, and

Figure 8 is a cross sectional view of a further modified form.

According to one form of the invention as shown by Figures 1 to 6, the sealing ring comprises an annular body or ring 1 formed of moulded rubber like material and the inner face of the body has an annular channel or groove 2 therein forming a sealing lip 3 for pressing on the rotating shaft and a sealing lip 4 which bears against the stationary housing. The sides of the annular groove in the face of the sealing ring incline outwardly and an inwardly directed rib 5 is formed at the end of each side. The two sealing lips 3 and 4 are pressed outwardly by means of plate or strip springs 6 having two inclined arms 7 which press against each side of the groove, the arms of the spring being arranged radially of the ring across the groove. The strip or plate spring 6 between the arms is bent into a U-shaped curved portion 8 to give flexibility to the springs and enable a pressure to be applied to the full width of the sealing lips. A series of these springs are arranged radially in the groove and at close intervals therearound. The outer ends of the springs are located and held in position by the said annular rib 5 at each side of the groove, and radial webs 9 are moulded in the groove to position the springs laterally. The body of the ring is strengthened by a metal or stiffening ring 10 L-shaped in cross section and moulded on the outer face of the sealing ring, one flange of this metal ring lying on the outer periphery of the sealing ring, the sealing lip 4 for the stationary member or housing extending beyond the metal ring at the periphery. The two arms 7 of the strip or plate spring will press the two sealing lips outwardly and the re-action on the two arms of the spring will balance one another.

In a further form of the invention as shown by Figure 7, the rubber body forming the sealing ring has an annular groove 11 in the inner face and helical springs 12 are radially arranged in the groove at intervals therearound and these springs may be spaced apart by moulding inset recesses 13 in the sides of the groove for receiving the ends of the springs. The sealing lip 14 on the shaft is formed by the inner periphery of the annular body of the rubber or like ring, the bore 15 being conical before being fitted on the shaft 16. The annular flange forming the sealing lip 16 is forced inwardly by the helical springs and the entire bore of the ring or a substantial portion of the bore may have contact with the shaft to obtain a substantial grip. The body of the ring is moulded in a metal casing 17 L-shaped in cross section to lie on the outer face of the sealing ring and around the periphery, the outer end of this peripheral portion being flanged inwardly. In a further modified form as shown by Figure 8 the rubber body may extend beyond the cylindrical portion of the casing 18 to form a sealing lip 19 against the cylindrical wall of the housing, the springs 12 pressing both lips into sealing contact. With the aforedescribed constructions, the springs apply considerable pressure on the sealing ring and when the sealing ring is in contact with the revolving shaft, a substantial length of contact with the shaft may be obtained, that is to say, the conical portion of the bore of the sealing ring is expanded so that it is automatically pushed into contact along its full length or substantially its full length. The expanded contact may vary according to the particular application of sealing ring.

I claim:

1. A packing ring which is fixed between a stationary member and a rotating member, comprising an annular ring of rubber or rubber like material having an annular groove in one face, annular sealing lips on the inner and outer periphery of the ring formed by the sides of the said groove, a series of independent springs arranged at intervals in the said groove and transversely thereof for pressing each lip outwardly, each spring comprising a plate spring having an arm bearing against each sealing lip, and partitions provided in the said annular groove to circumferentially position the springs and an annular inturned spring positioning rib around each sealing lip.

2. A packing ring which is fixed between a stationary member and a rotating member, comprising an annular ring of rubber or rubber like material having an annular groove in one face, an L-shaped stiffening ring moulded on the outer face of the ring and a portion of the periphery, annular sealing lips on the inner and outer periphery of the ring formed by the sides of the said groove, one of the lips extending beyond the annular flange on the L-shaped stiffening ring and a series of independent springs arranged at intervals in the said groove and transversely thereof for pressing each lip outwardly.

HOWARD CLAYTON-WRIGHT.

REFERENCES CITED

The following references are of record in the file of this patent:

UNITED STATES PATENTS

| Number | Name | Date |
|---|---|---|
| 1,621,272 | Raymond | Mar. 15, 1927 |
| 1,802,177 | Knight | Apr. 21, 1931 |
| 1,924,555 | Hubbard | Aug. 29, 1933 |
| 2,162,104 | Mosher | June 13, 1939 |
| 2,165,052 | Hering | July 4, 1939 |

FOREIGN PATENTS

| Number | Country | Date |
|---|---|---|
| 481,331 | Great Britain | 1938 |
| 541,336 | Great Britain | 1941 |
| 700,403 | Germany | 1940 |